(12) United States Patent
Allen et al.

(10) Patent No.: US 11,465,070 B2
(45) Date of Patent: Oct. 11, 2022

(54) NOZZLE AND SPRAY CHAMBER FOR LIQUID SEPARATOR AND CONCENTRATOR

(71) Applicant: Colorado Extraction Systems, LLC, Wheat Ridge, CO (US)

(72) Inventors: Michael David Allen, Superior, CO (US); Quinton Lane Van Gundy, Aurora, CO (US)

(73) Assignee: Colorado Extraction Systems, LLC, Wheat Ridge, CO (US)

(*) Notice: Subject to any disclaimer, the term of this patent is extended or adjusted under 35 U.S.C. 154(b) by 140 days.

(21) Appl. No.: 16/948,057

(22) Filed: Aug. 28, 2020

(65) Prior Publication Data

US 2020/0391136 A1  Dec. 17, 2020

Related U.S. Application Data

(60) Continuation of application No. 16/402,322, filed on May 3, 2019, now Pat. No. 10,786,753, which is a division of application No. 15/086,838, filed on Mar. 31, 2016, now Pat. No. 10,307,689.

(60) Provisional application No. 62/141,819, filed on Apr. 1, 2015.

(51) Int. Cl.

| | |
|---|---|
| *B01D 1/06* | (2006.01) |
| *B01D 1/20* | (2006.01) |
| *B01D 1/30* | (2006.01) |
| *B01D 5/00* | (2006.01) |
| *F28B 7/00* | (2006.01) |
| *B01D 3/02* | (2006.01) |

(52) U.S. Cl.
CPC .......... *B01D 5/0036* (2013.01); *B01D 1/065* (2013.01); *B01D 1/20* (2013.01); *B01D 1/30* (2013.01); *B01D 5/006* (2013.01); *F28B 7/00* (2013.01); *B01D 3/02* (2013.01)

(58) Field of Classification Search
CPC ...... B01D 5/0036; B01D 5/006; B01D 1/065; B01D 1/20; B01D 1/30; B01D 3/02; F28B 7/00
See application file for complete search history.

(56) References Cited

U.S. PATENT DOCUMENTS

| | | | |
|---|---|---|---|
| 1,286,315 | A | 12/1918 | Heuser |
| 2,428,045 | A | 9/1947 | Sharp et al. |
| 2,439,260 | A | 4/1948 | Meade et al. |

(Continued)

FOREIGN PATENT DOCUMENTS

WO   WO2015011048 A1 * 1/2015 ............. B01J 4/004

OTHER PUBLICATIONS

Merriam-Webster. Chamber. (Year: 2019).

*Primary Examiner* — Gabriel E Gitman
(74) *Attorney, Agent, or Firm* — MG Miller Intellectual Property Law LLC

(57) ABSTRACT

A liquid separator and concentrator is disclosed. An example liquid separator and concentrator includes a separator column. A spray chamber has a sprayer nozzle to spray an influent within the spray chamber and create a falling film in the separator column. A heating jacket surrounds the separator column, wherein the heating jacket heats the falling film to evaporate at least one portion of the falling film and leaves a concentrate. A concentrate collection vessel receives the concentrate from the separator column.

10 Claims, 4 Drawing Sheets

(56) References Cited

U.S. PATENT DOCUMENTS

| | | | |
|---|---|---|---|
| 2,525,025 | A | 10/1950 | Feil |
| 3,306,829 | A | 2/1967 | Patterson et al. |
| 3,370,635 | A | 2/1968 | Kumm |
| 3,451,895 | A | 6/1969 | Webb |
| 3,828,837 | A | 8/1974 | Lund et al. |
| 4,285,775 | A | 8/1981 | Hamann |
| 4,462,463 | A | 7/1984 | Gorham, Jr. |
| 4,790,371 | A | 12/1988 | Zundel |
| 4,899,938 | A | 2/1990 | Havrilla, Jr. |
| 5,340,444 | A | 8/1994 | Heijden |
| 5,458,739 | A * | 10/1995 | Boucher ............... B01D 3/4205 203/88 |
| 6,684,648 | B2 | 2/2004 | Faqih |
| 6,830,654 | B1 * | 12/2004 | Salmisuo ........... B01D 19/0047 159/48.1 |
| 7,628,893 | B1 * | 12/2009 | Bonser ................... B01D 5/006 203/25 |
| 2006/0231379 | A1 | 10/2006 | Raviv et al. |
| 2007/0134387 | A1 | 6/2007 | Stippler et al. |
| 2012/0093992 | A1 | 4/2012 | Gattermeyer et al. |
| 2012/0318017 | A1 | 12/2012 | Cheng |
| 2014/0323787 | A1 | 10/2014 | Carl |

\* cited by examiner

NOZZLE AND SPRAY CHAMBER FOR LIQUID SEPARATOR AND CONCENTRATOR

CLAIM OF PRIORITY

This application is a continuation of U.S. patent application Ser. No. 16/402,322, filed on May 3, 2019, entitled "Liquid Separator and Concentrator", which is a divisional of U.S. patent application Ser. No. 15/086,838, filed on Mar. 31, 2016 entitled "Liquid Separator and Concentrator", which claims priority to U.S. Provisional Patent Application No. 62/141,819, filed Apr. 1, 2015 entitled "Improved Volatiles Separator And Non-Volatiles Concentrator System and Methods of Use," the contents of all of which hereby incorporated by reference in their entirety.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

BACKGROUND

Separating component substances from a liquid is typically accomplished by distillation, in which the liquid is heated and higher boiling point liquids evaporate. Distillation is a physical separation process (not a chemical reaction). Distillation can be controlled to produce complete separation (e.g., producing a nearly pure concentrate), or partial separation of the components. Distillation is used in many industrial applications.

BRIEF DESCRIPTION OF THE PREFERRED EMBODIMENTS

DETAILED DESCRIPTION OF THE PREFERRED EMBODIMENTS

Figure 1:
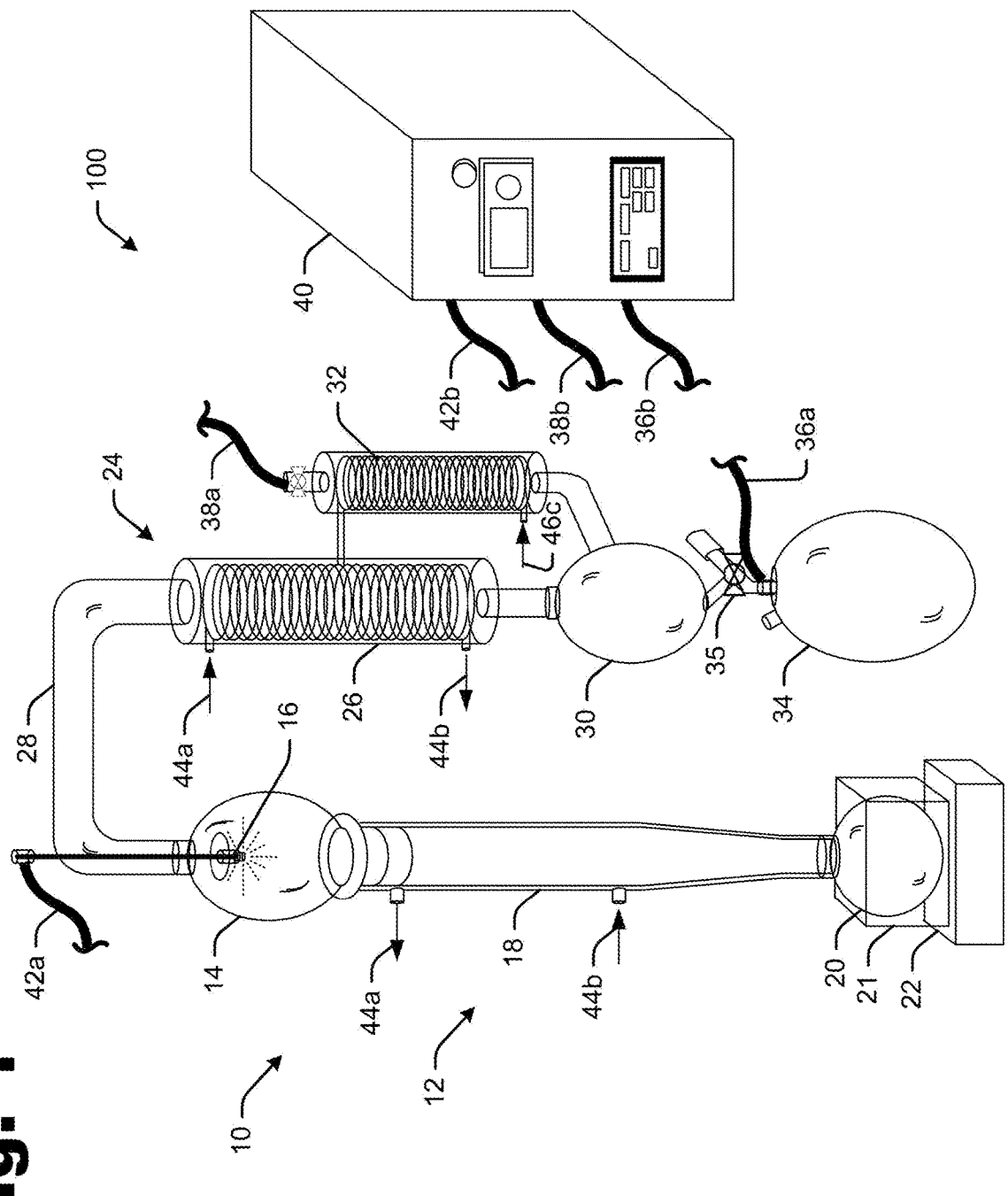
FIG. 1 shows an example liquids separator and concentrator system.

A liquids separator and concentrator is disclosed which provides an improved system for separating at least one component from a liquid or fluid, and concentrating at least one other component in the liquid. It is noted that the liquids separator and concentrator system and method described herein may be implemented to separate any liquid component(s) to form the desired concentrate, based on design considerations such as, but not limited to, the influent liquid, the partial pressure(s) of the components of the liquid, operating temperature, pressure, residence time, column dimensions (e.g., length, diameter), etc.

The improved liquids separator and concentrator may be implemented as a continuous-flow, closed loop system. The system may have a substantially spherical glass spray chamber mounted above a glass falling film separator column. In an example, an indirectly heated hot-water jacket surrounds a glass separator column. In an example, the improved system and method disclosed herein strips at least one component from an influent liquid and the evaporated component exits through the top of the separator column through a condenser, forming a condensate product for re-use. The system and method simultaneously produces and collects a concentrate product at the bottom of the evaporator column (containing a very-low concentration of the removed component).

In an example, a spray nozzle is configured in the glass spray chamber. The spray nozzle may be a MW7 stainless-steel hollow cone, with an integral 120 mesh strainer. The spray nozzle may be flow-rated at approximately 4.43 gallons per hour (GPH) at 40 PSI, with an approximately 160-degree spray angle at 100 psi. Typical flow rates can range from 0.3 Liters per Hour (LPH) to 20 LPH. But with larger higher flow rates can be accommodated based on design considerations (e.g., size of the separator column). Flow rates may also vary depending on the type of component (e.g., solvent) being stripped or separated. Other types of nozzles with either higher or lower flow ratings can be used. In an example, the fluids to be processed are sprayed to impact the inner chamber wall of the glass spray chamber at close to an orthogonal angle in order to maximize atomization of the fluids and formation of very thin laminar flows on the inner chamber wall of the glass spray chamber that gravity flows into the separator column. It is noted that preheating and/or other pretreatment of the influent may also be implemented to increase vaporization.

Glass components (e.g., separator column) enable visual inspection of the separation process. The capability to visually inspect the process in real time via the glass chamber and evaporation column enables system control, minimizing carryover into the condensate, and better control of the quality of the concentrate. However, other materials (e.g., stainless-steel) may also be used.

In an example, heating and chilling or condensate subsystems are rated for 3500 W. However, these can be scaled up or down in size and power requirements based on various design considerations.

A high vacuum in the range of about 20 to 250 Torr enhances separation at lower processing temperatures and reduced residence time. During an example operation, the influent is provided in the separator column for a short residence time, and in temperatures less than about 85 degrees Celsius (C.). The relatively low operating pressures and temperatures are energy-efficient and serve to minimize heat-degradation of the concentrate.

In an example, a modular design is implemented, enabling multiple evaporator columns to be combined in parallel for increased feed-flow rates, resulting in a minimal system-footprint impact.

The liquids separator and concentrator has many applications, including but not limited to removing alcohol from a liquid (e.g., wine or other spirits), concentrating herbal-extraction oils in chemical, industrial, medical applications, and other applications in which removing or stripping at least one component from heat-sensitive feed substrates which require low temperatures and a short residence time to prevent degradation of the concentrate product.

In an example application, the liquids separator and concentrator may be implemented as a continuous, closed loop alcohol separation and oil concentration system. The liquids separator and concentrator utilizes falling film technology in a safe, reliable, easy to use design. The liquids separator and concentrator quickly and efficiently separates tinctures into two distinct streams, oil and solvent.

The liquids separator and concentrator is designed to produce high quality concentrate in a high throughput system. Due to consistent operation (constant temperatures, vacuum, and feed rate) results are repeatable regardless of the operator.

In an example, the liquids separator and concentrator operates with relatively high heat transfer coefficients due to partial two-phase flow. The liquids separator and concentrator provides the ability to handle foamy liquids.

Before continuing, it is noted that as used herein, the terms "includes" and "including" mean, but is not limited to, "includes" or "including" and "includes at least" or "including at least." The term "based on" means "based on" and "based at least in part on."

FIG. 1 shows an example liquids separator and concentrator system. An example liquids separator and concentrator system 100 includes a concentrator subsystem 10. The concentrator subsystem 10 includes a separator column 12. A spray chamber 14 is attached to the separator column 12. The spray chamber 14 includes a sprayer 16 to spray an influent fluid or liquid within the spray chamber. The spray hits the inner wall of the spray chamber 14 and creates a falling film (see, e.g., FIG. 3) in the separator column 12.

In an example, the sprayer 16 is configured to spray droplets as close as possible to 90 degrees to reduce bounce and drop formation. The spray nozzle sets up a droplet size that reduces atomization. All evaporation is controlled on the column face (or in the collection flask).

The example liquids separator and concentrator system 100 also includes a heating jacket 18 surrounding the separator column 12. In an example, the heating jacket is rated for about 4500 to 5500 W, although those skilled in the art would appreciate that the teachings herein can be appropriately adjusted in size and power requirements.

The heating jacket 18 heats the falling film to evaporate liquid and leaves a concentrate. The concentrate may be collected in a concentrate collection vessel 20. In an example, the concentrate collection vessel 20 may be positioned below the separator column 12 to receive the concentrate from the separator column 12 by gravity feed. A magnetic stirrer 22 may be provided for the collection vessel 20.

In an example, the concentrate collection vessel 20 may be heated (e.g., by hot water jacket 21 or other suitable heating device) to further evaporate any remaining liquid from the collected concentrate. In an example, the hot water jacket 21 is a double-jacketed, although it is not limited to double-jacketed. It is noted that the hot water jacket 21 may be heated with the same fluid that heats the heating jacket 18. For example, effluent hot water from hot water jacket 21 may be pumped into port 44b of the heating jacket 18. Or the hot water jacket 21 and heating jacket 18 may be heated independent of one another. It is also noted that the hot water jacket 21 (and heating jacket 18) may be heated by any heating fluid and is not limited to hot water.

The example liquid separator and concentrator system 100 also includes a condensing subsystem 24. In an example, the condensing subsystem 24 includes a first or "main" condenser column 26 to cool the evaporated portion exiting the concentrator subsystem 10 via cross-over 28. The condensing subsystem 24 may include a first or "auxiliary" evaporate collection vessel 30 to collect cooled evaporated portion from the first condenser column 26. The second or "main" condenser column 32 protects the vacuum pump from vapor that was not condensed by the first or "main" condenser.

The condensing subsystem 24 may also include a second condenser column 32. The second condenser column 32 may be connected to the first condenser column 26 through the first or "auxiliary" evaporate collection vessel 30 to further cool remaining evaporated portion. In an example, the second or "main" condenser column 32 feeds back to the first or "auxiliary" evaporate collection vessel 30.

A second evaporate collection vessel 34 may be provided below the first evaporate collection vessel 34 to collect cooled evaporated portion from the first evaporate collection vessel 30. A valve 35 may be provided between the first and second collection vessels 30 and 34. The valve may be operated such that when the lower flask fills, the valve may be closed to isolate the lower flask for transfer of the collected condensate. After emptying the lower flask 34, a vacuum may be applied at 36a to match the vacuum on the upper flask 30, so that condensate can again drain into the lower flask 34 by opening valve 35.

In an example, the cooling system for the condenser(s) is rated for chilling to about 0 to 10 degrees Celsius, although those skilled in the art would appreciate that the teachings herein can be appropriately adjusted in size and power requirements.

A vacuum (illustrated by vacuum lines 36a-b and 38a-b in FIG. 1) may be provided to draw the evaporated portion through at least the first condenser. In an example, a first vacuum (illustrated by vacuum line 36a-b) is connected on the second collection vessel 34. A second vacuum is connected to the second condenser 32 (illustrated by vacuum line 38a-b).

The example liquid separator and concentrator system 100 also includes a controller 40. The controller may be implemented to control one or more operating parameters, such as, but not limited to, temperature and/or flow rate of an influent (e.g., as illustrated by lines 42a-b); temperature and/or flow rate of a heating fluid for the concentrator subsystem 10 (e.g., as illustrated by arrows 44a-b); temperature and/or flow rate of a cooling fluid for the condensing subsystem 24 (e.g., as illustrated by arrows 46a-c); and/or temperature of the hot water jacket 21.

It is noted that various sensors (not shown) may measure flow rate, temperature, pressure, etc. during operation. Measurements may be sent to the controller 40, which may compare the values received to a set of desired parameters. The controller 40 may issue appropriate corrective commands to adjust valves, pumps, heaters, chillers, etc. to affect desired performance and/or output. It is further contemplated that various functions may be automated to reduce human labor, reduce the potential for human error, and increase precision by closer reproduction of desired conditions.

In an example, the liquid separator and concentrator system 100 is a continuous-flow system that utilizes a spray chamber 14 and falling film evaporator column 18. An indirectly heated fluid jacket surrounds the evaporator column 18. During operation, the sprayer 16 sprays the influent into spray chamber 14, which impinges on the inner wall of the spray chamber 14 and flows into evaporator column 18 as a falling film. The falling film is heated by the heated fluid jacket to evaporate and thereby "strip" a portion of the liquid from the falling film. Removing the evaporated portion forms a concentrate, which is collected in concentrate collection vessel 20.

The evaporated portion moves as a vapor upward through the top of the spray chamber and into a condenser subsystem 24. The evaporated portion is chilled to reform as a fluid which can be collected in evaporate collection vessel 34 and optionally reused. As such, the liquid separator and concentrator system 100 simultaneously produces and collects a concentrate product (containing a very-low or no concentration of the evaporated portion), and a product (e.g., solvent) that can be reused.

The construction of the system 100 may include any suitable materials (e.g., glass, stainless steel, etc.). In an example, glass condenser(s), evaporator(s), flask(s), crossover tube(s) and connecting tubing, and receiving flasks. Nozzles and valves (e.g., feed and vacuum valves) may be stainless steel. The spray deflector, flask valves, vacuum lines, feed lines, interconnections, and diaphragm surfaces (not shown) may be Teflon® or other chemically compatible material (e.g., HOPE, etc.). It is noted, however, that other materials may be used as will be readily appreciated by those having ordinary skill in the art after becoming family with the teachings herein.

In an example, the liquid separator and concentrator system 100 includes at least one glass component. For example, the spray chamber 14 and/or separator column 12 may be glass or other transparent material. Other component(s) may also be glass or other transparent material. Such a configuration enables visual inspection of the actual separation process in real-time. A clear glass concentrator subsystem 10 enables visual inspection of cleanliness and monitoring the actual evaporation process to determine if changes in temperature, pressure, flow rate or other operating parameters are needed to achieve maximum controlled falling film evaporation rate.

In an example, a laboratory-grade glass material may be implemented. The glass may be a laboratory-grade glass material with a low thermal-expansion coefficient and that is somewhat less susceptible to thermal-shock issues. Preferred glass materials may include, but are not limited to, borasilicate glasses (e.g., 33 expansion, low extractable borosilicate glass). Type I, Class A borasilicate glass may be selected to conform to one or more of the following specifications/requirements: USP Type I; ASTM E-438; Federal Specification DD-G-54 1b; and/or U.S. Pharmacopoeia Specifications.

It is noted that the separator and concentrator system 100 may be implemented as a continuous or near-continuous operation system, without a requirement to break vacuum. A spray nozzle within the expansion chamber enables at or near a 90-degree spray angle for maximum spray impact to set up a consistent laminar flow for the falling film. The falling film evaporation enables a more gentle evaporation with minimal carry-over into the condensate. The glass evaporation column facilitates the ability to control the evaporation process and thus optimize the concentrate. The connections (e.g., on the concentrate collection flask) aids in the infusion of oils or other substrates for treating finished products.

The concentrate collection flask may further include a magnetic stirrer 22 and/or a heating means 21 to enable treatment of the collected concentrate while the system 100 remains sealed from the atmosphere. The magnet stirrer 22 may be controlled to produce the desired stir rate.

Before continuing, it should be noted that the examples described above are provided for purposes of illustration, and are not intended to be limiting. Other devices and/or device configurations may be utilized to carry out the operations described herein.

Figure 2:
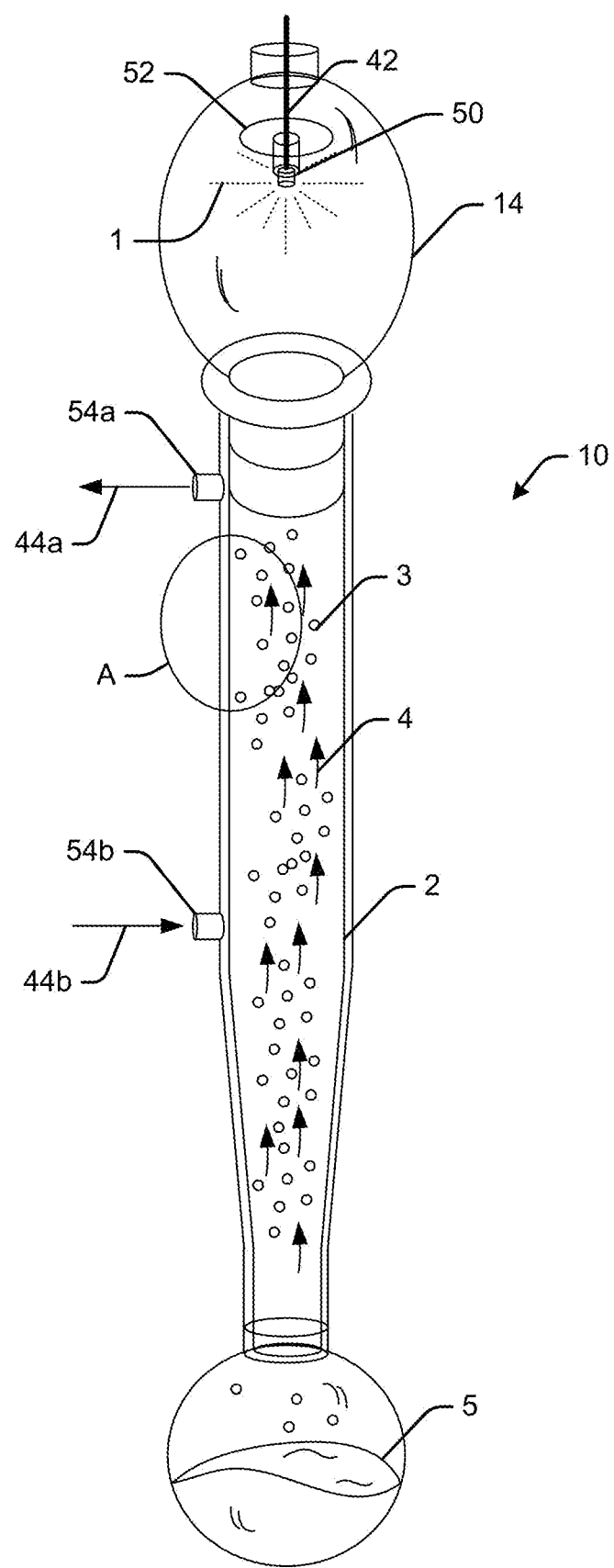
FIG. 2 is a detailed view of an example concentrator subsystem.

FIG. 2 is a detailed view of an example concentrator subsystem 10. The concentrator subsystem 10 includes a separator column. A spray chamber 14 is attached to the separator column 12. Influent is provided via line 42. In an example, an isovolume pump (not shown), such as a peristaltic pump, is operated to provide influent because of its fine control of quantifiable feed flow rates while minimizing system vacuum from pulling feed through the pump. However, other pumping means known in the art can also be employed in examples.

The actual flow rates used in the system may depend at least to some extent on design considerations. Example design considerations may include but are not limited to the type of liquid being stripped away/separated. Example flow rates can range from 0.3 LPH to 28 LPH. However, flow can be adjusted to accommodate various size components.

The spray chamber 14 includes a sprayer 16 to spray an influent fluid or liquid within the spray chamber (illustrated as spray 1 in FIG. 1). The spray 1 hits the inner wall of the spray chamber 14 and creates a falling film (see, e.g., FIG. 3) in the separator column 12.

In an example, the spray nozzle 50 is a MW stainless-steel hollow cone, with an integral 120 mesh strainer, and is flow-rated at approximately 4.43 GPH at 40 PSI, with an approximately 160 degree spray angle at 100 psi. However, other types of spray nozzles may be provided (e.g., hollow-cone pattern sprayer, etc.), with either higher or lower flow ratings and/or other configurations. The spray nozzle 50 may be substantially centrally located within the spray chamber, and the fluids to be processed are sprayed to impact the inner chamber wall at close to an orthogonal angle form a very thin laminar flows on the inner chamber wall. In an example, the influent may be pre-heated prior to spraying. The sprayed influent gravity flows into the separator column 12.

In an example, to ensure optimum performance of the falling film laminar flows over the interior surface area of the separator column 12 the separator column 12 may be aligned to be substantially and/or perfectly vertical to avoid channeling (thickening) of the flows, which can inhibit proper evaporative processes. For example, initially overfeeding the influent may wet all surfaces and maximize the evaporation rate. Still other examples are contemplated.

In an example, a deflector member 52 is installed above the spray nozzle 50. Deflector member 52 may help minimize the possibility that concentrate splashes back from the inner chamber wall and into the vapor stream of evaporate leading back to the first condenser. The deflector member 52 may also reduce or eliminate carry over and increase turbulence of the vapor to drop out further carryover of concentrate product in the vapor. The materials used for the deflector member may be flexible, yet stiff. For example, the materials used for the deflector member 52 may include but are not limited to polytetraflouroethylene (PTFE; aka "Teflon®) and/or polypropylene.

During operation, the sprayer 16 sprays the influent into spray chamber 14. The spray 1 impinges on the inner wall of the spray chamber 14 and flows into evaporator column 18 as a falling film 2. A heating jacket 18 surrounds the separator column 12. Heating jacket 18 may receive a heated fluid (e.g., via ports 54a-b) such that the inner wall of the separator column 12 is heated to a temperature sufficient to evaporate a portion of the liquid from the falling film 2, as can be seen in the illustration in FIG. 3.

Figure 3:
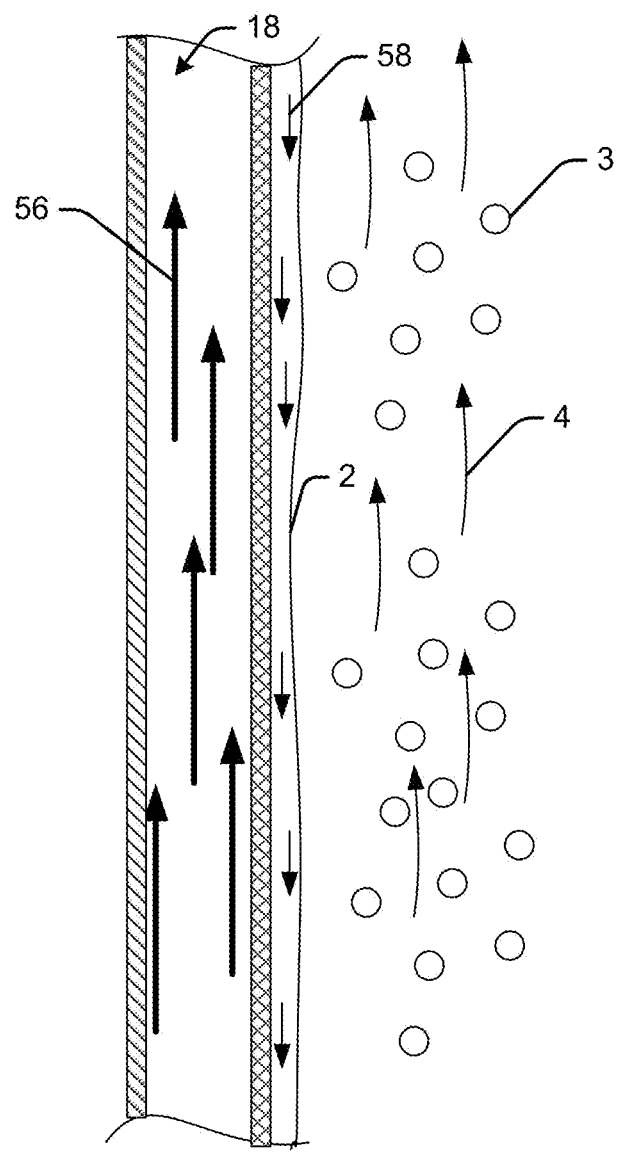
FIG. 3 is an illustration of liquids separation.

FIG. 3 is an illustration of liquid separation in magnified section A of FIG. 2. The heating jacket 18 heats the falling film 2 as it flows (e.g., by gravity in the direction of arrows 58) to evaporated portion 3 and leaves a concentrate 5 as shown in FIG. 2. The evaporated portion 3 move as a gas upward (illustrated by arrows 4) through the top of the spray chamber 14 and into the condenser subsystem 24. The concentrate 5 is collected by gravity feed in concentrate collection vessel 20. In an example, the concentrate collection vessel 20 may be heated to further evaporate any remaining portion to be evaporated from the collected concentrate 5.

Temperature regulation of the separator column 12 may be achieved by controlling the fluid flowing through the heating jacket 18. In an example, a pump (not shown) may be operated to cause fluid flow through the evaporator jacket. It is anticipated that the pump (not shown) may be located at any point in the jacket heating loop. It is contemplated that the heating loop may include temperature and pressure indicators. The arrows 56 in FIG. 3 illustrate one possible direction of fluid flow within the heater jacket 18. In this example, the hot water in the jacket flows generally counter-current (in a direction opposite) to the flow of the falling film. For example, water is pumped in through port 44b and exits port 44a.

It is noted that temperature may be regulated inside the heating jacket 18 based on fluid flow and/or temperature of the fluid. In an example, the fluid is heated by a temperature-altering (e.g., fluid heating) system which can heat the fluid to any desired temperature to achieve the desired result (e.g., partial and/or complete evaporation of the desired component(s)).

In an example, a high vacuum in the range of about 20 to 250 Torr further enhances liquids separation by allowing lower processing temperatures (e.g., less than about 85 degrees C.) and reduced residence time. The relatively low operating pressures and temperatures are energy-efficient and serve to minimize heat-degradation, producing a non-heat-sensitized, concentrate product. Of course, it is noted that any temperature and/or pressure may be utilized based at least in part on the desired portion to be evaporated and the desired portion to be collected as concentrate.

The operations shown and described with reference to FIG. 3 are provided to an illustration and is not limiting in any way.

Figure 4:
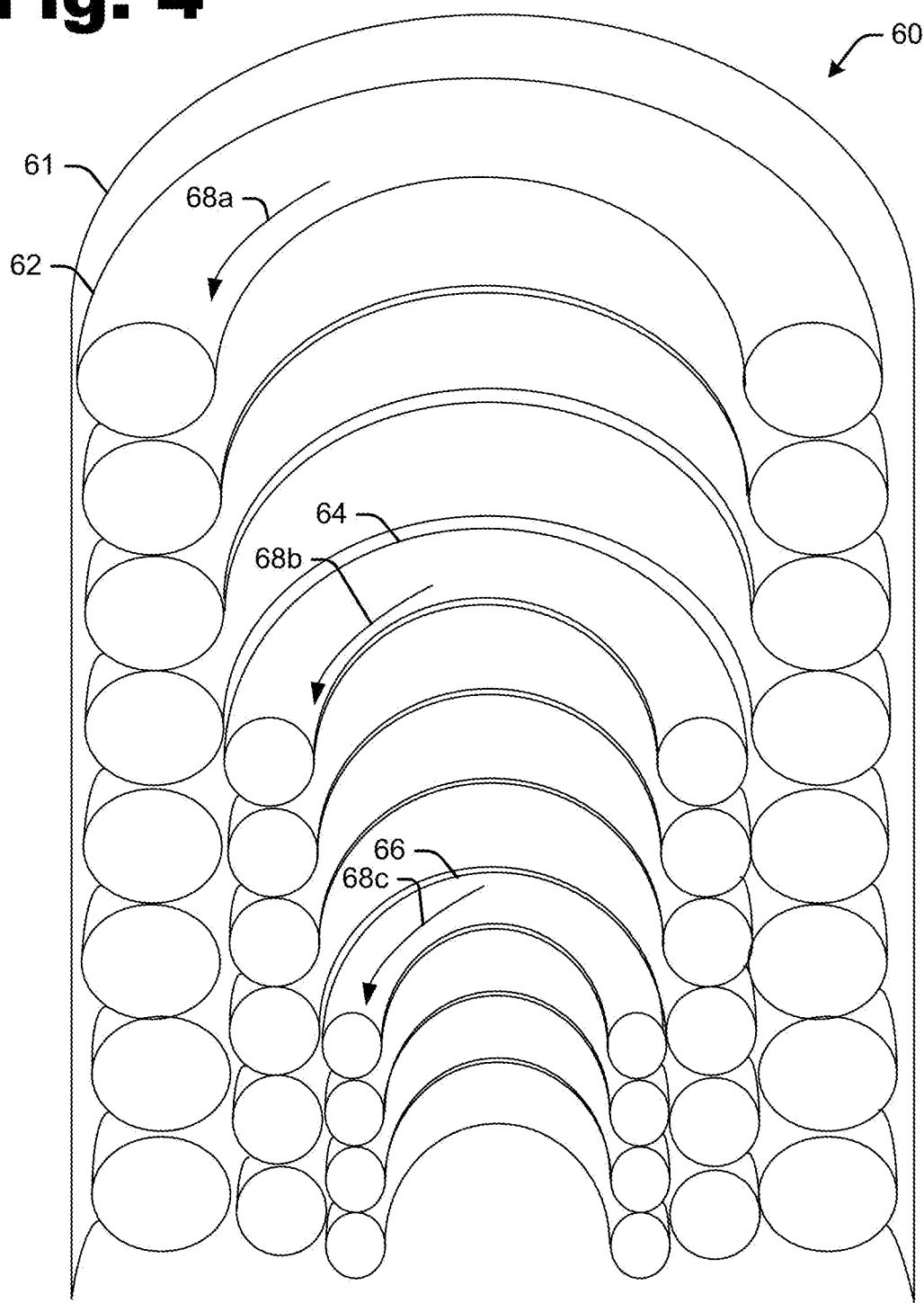
FIG. 4 is a detailed view of example cooling lines of a condenser of the condenser subsystem.

FIG. 4 is a detailed view of example cooling lines 60 of a condenser of the condenser subsystem 24. The partial cross section of a condenser shown in FIG. 4 may be of condenser 26 and/or 32. In an example, the condenser has a multi-layer condensing coil. For example, a triple layer condensing coil is shown in FIG. 4. In this example, the condenser coil has an outer chilling line 62 wrapping around an inner wall 61 of the at least one condenser. The condenser coil also has a nested chilling line 64 wrapping around inside the outer chilling line 62. The condenser coil also has an inner chilling line 66 wrapping around the inside of the nested chilling line 64.

In an example, temperature regulation involving fluid flowing through the condenser coils includes using a pump to cause fluid flow through the condenser coil. The arrows 68a-c illustrate one possible direction of condenser fluid flow. A temperature-altering system (e.g., a chiller) may be operated to chill the condenser fluid and thereby regulate the temperature inside the condenser. The pump (not shown) may be located at any point in the condenser loop. In an example, the condenser loop has temperature and/or pressure indicators.

It is noted that the examples shown and described are provided for purposes of illustration and are not intended to be limiting. Still other examples are also contemplated.

What is claimed is:

1. A liquid separator and concentrator subsystem, comprising:
   a spray chamber having a top opening, a bottom opening, and a singular curved wall extending therebetween,
      wherein the singular curved wall has an interior surface and an exterior surface;
   a sprayer having an influent receiving port and a spray nozzle, the influent receiving port and the spray nozzle being in fluid communications,
      wherein the sprayer is located completely within the spray chamber, and
      wherein the spray nozzle is configured to spray an influent passing through the top opening;
   a separator column, having a top end and a bottom end, the top end being permanently attached to the bottom opening allowing for the fluid communication therebetween;
   means for pumping the influent to and through the sprayer; and
   a collection vessel comprising a closed bottom, the collection vessel being permanently attached to the bottom end, the collection vessel and the separator column being in fluid communication.

2. The liquid separator and concentrator subsystem of claim 1, wherein the sprayer is configured to spray the influent with a flow rate in a range of 0.3 LPH to 28 LPH.

3. The liquid separator and concentrator subsystem of claim 2, the spray nozzle further comprising a hollow cone and an integrated mesh strainer at a terminal end of the hollow cone.

4. The liquid separator and concentrator subsystem of claim 3, wherein the sprayer is configured so that influent sprayed from the spray nozzle forms a spray angle of 160 degrees.

5. The liquid separator and concentrator subsystem of claim 4, wherein the sprayer is configured to be capable of passing influent through the spray nozzle with a pressure of 100 psi.

6. The liquid separator and concentrator subsystem of claim 5, wherein the spray nozzle is a pattern spray nozzle.

7. The liquid separator and concentrator subsystem of claim 6, wherein the spray nozzle is located centrally within the spray chamber.

8. The liquid separator and concentrator subsystem of claim 7, further comprising a heater configured to heat the influent prior to the influent entering the spray chamber.

9. The liquid separator and concentrator subsystem of claim 8, wherein the sprayer is configured so that influent sprayed from the spray nozzle will have a droplet size with a mean diameter in the range of 20 microns to 50 microns.

10. The liquid separator and concentrator subsystem of claim 9, wherein the collection vessel further comprises a magnetic stirrer contained therein.

* * *